(12) United States Patent
Maaijen et al.

(10) Patent No.: US 11,512,222 B2
(45) Date of Patent: Nov. 29, 2022

(54) METHOD OF PREPARING AN OXIDATIVELY CURABLE COATING FORMULATION

(71) Applicant: Catexel Limited, London (GB)

(72) Inventors: Karin Maaijen, Leiden (NL); Ronald Hage, Leiden (NL)

(73) Assignee: Borchers GmbH, Langenfeld (DE), a Subsidiary of Milliken & Company ( * ) Notice: Subject to any disclaimer, the term of this patent is extended or adjusted under 35 U.S.C. 154(b) by 0 days.

(21) Appl. No.: 16/053,153

(22) Filed: Aug. 2, 2018

(65) Prior Publication Data

US 2018/0340092 A1 Nov. 29, 2018

Related U.S. Application Data

(63) Continuation of application No. PCT/GB2017/050284, filed on Feb. 6, 2017.

(30) Foreign Application Priority Data

Feb. 5, 2016 (EP) .................................. 16154518

(51) Int. Cl.
| | |
|---|---|
| C08L 67/00 | (2006.01) |
| C09D 167/08 | (2006.01) |
| C08G 63/91 | (2006.01) |
| C08K 5/00 | (2006.01) |
| B01J 23/34 | (2006.01) |
| B01J 27/24 | (2006.01) |
| B01J 31/18 | (2006.01) |
| C09F 9/00 | (2006.01) |
| C09D 7/20 | (2018.01) |

(52) U.S. Cl.
CPC ........... *C09D 167/08* (2013.01); *C08G 63/91* (2013.01); *C08K 5/0091* (2013.01); *C09D 7/20* (2018.01); *C09F 9/00* (2013.01); *B01J 23/34* (2013.01); *B01J 27/24* (2013.01); *B01J 31/182* (2013.01); *C08L 67/00* (2013.01)

(58) Field of Classification Search
None
See application file for complete search history.

(56) References Cited

U.S. PATENT DOCUMENTS

| | | |
|---|---|---|
| 5,274,147 A | 12/1993 | Kerschner et al. |
| 5,284,944 A | 2/1994 | Madison et al. |
| 2001/0008932 A1 | 7/2001 | Bakkeren et al. |
| 2005/0245639 A1 | 11/2005 | Oostveen et al. |

FOREIGN PATENT DOCUMENTS

| | | |
|---|---|---|
| EP | 0902021 A2 | 3/1999 |
| EP | 1382648 A1 | 1/2004 |
| WO | 2003/029371 A1 | 4/2003 |
| WO | 2003/093384 A1 | 11/2003 |
| WO | 2008/003652 A1 | 1/2008 |
| WO | 2011/098583 A1 | 8/2011 |
| WO | 2011/098584 A1 | 8/2011 |
| WO | 2011/098587 A1 | 8/2011 |
| WO | 2012/079624 A1 | 6/2012 |
| WO | 2012/093250 A1 | 7/2012 |
| WO | 2013/045475 A1 | 4/2013 |
| WO | 2013/092441 A1 | 6/2013 |
| WO | 2013/092442 A1 | 6/2013 |
| WO | 2014/086556 A1 | 6/2014 |
| WO | 2014/095670 A1 | 6/2014 |
| WO | WO-2014122433 A1 * | 8/2014 ............... C09D 7/63 |
| WO | 2015/082553 A1 | 6/2015 |

OTHER PUBLICATIONS

Ashmawy et al., Water photolysis. Part 1. The photolysis of co-ordinated water in [{MnL(H2O)}2][ClO4]2(L = dianion of tetradentate O2N2-donor Schiff bases). A model for the manganese site in photosystem II of green plant photosynthesis. J Chem Soc Dalton Trans. 1985;7:1391-1397.

Bhula et al., A new model for the oxygen-evolving complex in photosynthesis. A trinuclear .mu.3-oxomanganese(III) complex which contains a .mu.-peroxo group. J Am Chem Soc. 1988;110(22):7550-2.

Bieleman, Driers. Chimia. 2002;56(5):184-190.

Bieleman, Progress in the Development of Cobalt-free Drier Systems. Macromol Symp. 2002;187:811-821.

Brewer et al., Synthesis and properties of two bimetallic mixed-valence di-μ-oxo manganese complexes with different tetra-aza macrocyclic ligands. J Chem Soc Chem Commun. 1988;17:1219-20.

Canty et al., Drier Catalyst Activity in Organic Coatings. Industrial and Engineering Chemistry. Jan. 1960;52(1):67-70.

Chaudhuri et al., The Chemistry of 1,4,7-Triazacyclononane and Related Tridentate Macrocyclic Compunds. Prog Inorg Chem. 1987;35:329-436.

Cooper et al., Mixed valence interactions in di-.mu.-oxo bridged manganese complexes. J Am Chem Soc. 1977;90(20):6623-30.

De Boer et al., Mechanism of Cis-Dihydroxylation and Epoxidation of Alkenes by Highly H2O2 Efficient Dinuclear Manganese Catalysts. Inorg Chem. 2007;46(16):6353-72.

Golombek et al., Quantitative analysis of dinuclear manganese(II) EPR spectra. J Magn Reson. Nov. 2003;165(1):33-48.

Lee et al., Reversible O2 Binding to a Dinuclear Copper(I) Complex with Linked Tris(2-pyridylmethyl)amine Units: Kinetic-Thermodynamic Comparisons with Mononuclear Analogues. J Am Chem Soc. 1995;117:12498-513.

(Continued)

*Primary Examiner* — Richard A Huhn

(74) *Attorney, Agent, or Firm* — FisherBroyles, LLP; Louis F. Wagner

(57) ABSTRACT

The present invention relates to a method of preparing an oxidatively curable coating formulation made from an oxidatively curable alkyd-based resin, a complex comprising one or more manganese ions and one or more triazacyclononane-based ligands; and to the use of triazacyclononane-based ligands for accelerating the rate of curing of an alkyd-based resin formulation by such complexes. The formulations may be paints or other oxidatively curable coating compositions.

11 Claims, No Drawings

(56) References Cited

OTHER PUBLICATIONS

Oyman et al., Oxidative drying of alkyd paints catalysed by a dinuclear manganese complex (MnMeTACN). Surface Coatings International Part B: Coatings Transactions. Dec. 2005;88:269-275.

Oyman et al., A promising environmentally-friendly manganese-based catalyst for alkyd emulsion coatings. Polymer. 2004;45:7431-6.

Van Gorkum et al., Fast autoxidation of ethyl linoleate catalyzed by [Mn(acac)3] and bipyridine: a possible drying catalyst for alkyd paints. Inorg Chem. Apr. 19, 2004;43(8):2456-8.

Van Gorkum et al., The oxidative drying of alkyd paint catalysed by metal complexes. Coordination Chemistry Reviews. 2005;249:1709-28.

Wei et al., Kinetic Preference without Thermodynamic Stabilization in the Intra- vs Intermolecular Formation of Copper-Dioxygen Complexes. Inorg Chem. 1994;33:4625-6.

Weissenborn et al., Emulsification, drying and film formation of alkyd emulsions. Progress in Organic Coatings. 2000;40:253-266.

Wieghardt et al., Synthesis of a Tetranuclear Manganese(IV) Cluster with Adamantane Skeleton: [(C6H15N3) 4Mn4O6]4. Angew Chem Int Ed Engl. 1983;22(4):328.

"In Defence of Oxidation States", Nicholas C. Norman and Paul G. Pringle, Dalton Transaction, Royal Society of Chemistry, published Nov. 26, 2021.

\* cited by examiner

METHOD OF PREPARING AN OXIDATIVELY CURABLE COATING FORMULATION

CROSS-REFERENCE TO RELATED APPLICATIONS

This application is a continuation application, filed under 35 U.S.C. § 111(a), of International Application No. PCT/GB2017/050284, filed on Aug. 10, 2017 in English and designating the United States, published as WO 2017/134463 A1, which claims priority to European Patent Application No. 16154518.1, filed on Feb. 5, 2016. The entire contents of each of the above-referenced applications are incorporated herein by reference.

FIELD OF THE INVENTION

The present invention relates to a method of preparing an oxidatively curable coating formulation made from an oxidatively curable alkyd-based resin, a complex comprising one or more manganese ions and one or more triazacyclononane-based ligands; and to the use of triazacyclononane-based ligands for accelerating the rate of curing of an alkyd-based resin formulation by such complexes. The formulations may be paints or other oxidatively curable coating compositions.

BACKGROUND OF THE INVENTION

Alkyd resins are a well-understood and dominant binder in many oxidatively curable paints and other solvent-based coatings. Alkyd emulsion paints, in which the continuous phase is aqueous, are also widely available commercially. Alkyd resins are produced by the reaction of polyols with carboxylic acids or anhydrides. To make them susceptible to what is commonly referred to as a drying process, some alkyd resins are reacted with unsaturated triglycerides or other source of unsaturation. Plant and vegetable oils, such as linseed oil, are frequently used as the source of triglycerides. In these drying processes, unsaturated groups, in particular carbon-carbon double bonds, can react with oxygen from the air, causing the oils to crosslink, form a three-dimensional network, and harden. This oxidative curing process, although not drying, gives the appearance of drying and is often and herein referred to as such. The length of time required for drying depends on a variety of factors, including the constituents of the alkyd resin formulation and the amount and nature of the liquid continuous phase (e.g. solvent) in which the alkyd resin is formulated.

Film formation results from the autoxidation and polymerisation chemistries that occur during the drying of alkyd-based resins. It will proceed in the absence of catalysis. However, it is customary to include in formulations of curable resins small, i.e. catalytic, quantities of optionally organic metal salts, often referred to as metal driers/siccatives, which catalyse the polymerisation of unsaturated material so as to form the three-dimensional network.

Driers used for solvent-based coatings are often alkyl carboxylates, typically $C_{6-18}$ carboxylates, of metals such as cobalt, manganese, lead, zirconium, zinc, vanadium, strontium, calcium and iron. These metal carboxylates are often referred to as metal soaps. Redox-active metals, such as manganese, iron, cobalt, vanadium and copper, enhance radical formation, and thus the oxidative curing process, whilst so-called secondary driers (sometimes referred to as auxiliary driers), such as complexes based on strontium, zirconium and calcium, enhance the action of the redox-active metals. Often these soaps are based on medium-chain alkyl carboxylates such as 2-ethyl-hexanoate. The lipophilic units in such soaps enhance the solubility of the drier in solvent-based paints and other oxidatively curable coating compositions.

As well as metal soaps, a variety of metal driers that are redox metal complexes containing organic chelants can be used as driers, for example manganese complexes comprising 2,2'-bipyridine (bpy).

Whilst cobalt driers have been employed for many years as paint driers, there is a desire to develop alternatives, not least since cobalt soaps may need to be registered as carcinogenic materials. Iron- and manganese-based paint driers in particular have received considerable attention in recent years in the academic and patent literature as alternatives to cobalt-based driers. For some recent academic publications addressing this topic in detail see publications by J H Bieleman (in *Additives in Plastics and Paints, Chimia*, infra)); J H Bieleman (*Marcomol. Symp.*, 187, 811 (2002)); and R E van Gorkum and E Bouwman (*Coord. Chem. Rev.*, 249, 1709 (2005)).

WO 03/093384 A1 (Ato B. V.) describes the use of reducing biomolecules in combination with transition metal salts or complexes based on pyrazoles, aliphatic and aromatic amines, 2,2'-bipyridine (bpy), 1,10-phenanthroline (phen) and 1,4,7-trimethyl-1,4,7-triazacyclononane ($Me_3TACN$).

WO 03/029371 A1 (Akzo Nobel N. V.) describes the use of complexes comprising Schiff base compounds to enhance the drying of coatings, in which complexes at least one solubilising group is covalently bound to the organic chelant.

EP 1382648 A1 (Universiteit Leiden) describes the use of manganese complexes with acetylacetonate and bidentate nitrogen donor chelants in paint drying.

WO 2008/003652 A1 (Unilever PLC et al.) describes the use of specific classes of tetradentate, pentadentate or hexadentate nitrogen chelants bound to manganese and iron as siccatives for curing alkyd-based resins.

WO 2012/079624 A1 (PPG Europe BV) describes alkyd-based coating compositions comprising iron- and manganese-containing complexes in combination with potassium salts of an organic acid. WO 2013/045475 A1 (PPG Europe BV) describes compositions comprising modified alkyd binders and iron- and manganese-containing complexes. WO 2015/082553 A1 (PPG Europe BV) describes drier compositions for two oxidisable alkyd-based coating compositions, which compositions comprise at least one iron complex with at least one manganese, cerium, vanadium or copper salt of a carboxylic acid and at least one ligand.

Oyman et al. describe the oxidative drying of alkyd paints by $[Mn_2(\mu-O)_3(Me_3TACN)_2](PF_6)_2$ (Z O Oyman et al., *Surface Coating International Part B—Coatings Transaction*, 88, 269 (2005)). WO 2011/098583 A1, WO 2011/098584 A1 and WO 2011/098587 A1 (each DSM IP Assets B. V.) describe the use of a variety of dinuclear manganese complexes with $Me_3TACN$ as chelant for paint drying.

WO 2013/092441 A1 and WO 2013/092442 A1 (both Akzo Nobel Coatings International B. V.) describe the use in coating compositions of mixtures of Mn salts with either a molar excess of $Me_3TACN$ as chelant with respect to the Mn salt, or a molar excess of Mn salts with respect to $Me_3TACN$. The Mn salts were selected from $Mn^{2+}X_n$ whereby n=2 and the anion is selected from $PF_6^-$, $SbF_6^-$, $AsF_6^-$, $BF_4^-$, $B(C_6F_5)_4^-$, $Cl^-$, $Br^-$, $I^-$, $NO_3^-$, or $RCOO^-$ (with R=$C_{1-20}$alkyl, $C_{6-18}$aryl, optionally substituted with heteroatoms or a polymeric residue), or in case n=2, the anion is $SO_4^{2-}$.

The use of mixtures of metal salts and chelants to enhance drying of paint formulations is known. For example, W H Canty, G K Wheeler and R R Myers (*Ind. Eng. Chem.*, 52, 67 (1960)) describe the drying capability of a mixture of phen and Mn soap, which is similar to that of prepared Mn-phen complexes. Mixtures of bpy and manganese soaps show a better drying performance than manganese soaps without bpy (see P K Weissenborn and A Motiejauskaite, *Prog. Org. Coat.*, 40, 253 (2000)). Also, R van Gorkum et al. (*Inorg. Chem.*, 43, 2456 (2004)) describe that the addition of bpy to Mn(acetylacetonate)$_3$ gives an acceleration in the drying performance, and attribute this to the formation of Mn-bpy complexes. The use of manganese complexes with acetylacetonate and bidentate nitrogen donor chelants in paint drying has also been described in EP 1382648 A1 (Universiteit Leiden).

WO 2014/095670 A1 (Akzo Nobel Coatings International B. V.) describes driers comprising dinuclear Mn complexes with two 1,4,7-trialkyltriazacyclononane chelants, at least one oxy bridge and an additional amount of 1,4,7-trialkyltriazacyclononane chelant such that the 1,4,7-trialkyltriazacyclononane chelant:Mn ratio is at least 1.25:1. It is described in this publication that, although the oxy-bridged dinuclear manganese complex may already contain 1,4,7-trialkyltriazacyclononane ligands other ligands can be used if they have a lower binding constant than the 1,4,7-trialkyltriazacyclononane ligands; and, if 1,4,7-trialkyltriazacyclononane ligands are not part of the original oxy-bridged dinuclear manganese complex, a sufficient quantity of 1,4,7-trialkyltriazacyclononane needs to be supplied to achieve the desired ratio.

Notwithstanding the advances made recently to develop alternatives to cobalt-based driers, there remains a need in the art of oxidatively curable formulations for alternative siccative systems, which do not comprise cobalt-based driers, but which nevertheless exhibit acceptable rates of curing. The present invention is intended to address this need.

SUMMARY OF THE INVENTION

We have surprisingly found that triazacyclononane-based ligands may be used to enhance the siccative activity towards (i.e. ability to cure) alkyd-based resins of manganese ion-containing complexes that do not comprise triazacyclononane-based ligands. What is particularly surprising is that the siccative-enhancing effect conferred by the addition of these triazacyclononane-based ligands appears more pronounced on complexes that lack triazacyclononane-based ligands, than on complexes that comprise such ligands. This is the case even where one molar equivalent of triazacyclononane-based ligand is added per manganese ion, and thus wherein the molar ratio of triazacyclononane-based ligand:manganese ions resultant in the mixture is approximately 1:1, which is particularly unexpected in view of the prior art.

The invention thus provides a way in which the skilled person can enhance the siccative effect, of complexes not based on triazacyclononane-based ligands, using triazacyclononane-based ligands. This increases the ways in which such complexes can be used and is thus of benefit to the art.

Viewed from a first aspect, therefore, the invention provides a method of preparing an oxidatively curable formulation, comprising contacting:

(i) an alkyd-based resin;
(ii) a chelant of formula (I):

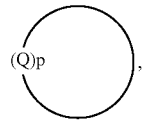

(wherein:

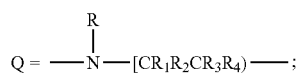

p is 3;
R is independently selected from the group consisting of $C_{1-24}$alkyl, $C_{6-18}$aryl, $C_{6-18}$aryl$C_{1-6}$alkyl, $CH_2CH_2OH$ and $CH_2COOH$; and
$R_1$, $R_2$, $R_3$, and $R_4$ are independently selected from H, $C_{1-4}$alkyl and hydroxy$C_{1-4}$-alkyl); and (iii) a complex comprising one or more manganese ions having oxidation states independently selected from (II)-(V) and a chelant chelating through either nitrogen atoms or nitrogen and oxygen atoms, with the provisos that:
(1) the complex does not comprise two manganese ions bridged by three ligands, at least one of which is a bridging oxo ($O^{2-}$) ligand; and
(2) the complex does not comprise a chelant of formula (I).

Viewed from a second aspect, the invention provides the use of a chelant of formula (I), as defined in connection with the first aspect of the invention, for increasing the rate of curing of an alkyd-based resin formulation by a complex, the complex comprising one or more manganese ions having oxidation states independently selected from (II)-(V) and a chelant chelating through either nitrogen atoms or nitrogen and oxygen atoms, with the provisos that:
(1) the complex does not comprise two manganese ions bridged by three ligands, at least one of which is a bridging oxo ($O^{2-}$) ligand; and
(2) the complex does not comprise a chelant of formula (I).

Further aspects and embodiments of the present invention will be evident from the discussion that follows below.

DETAILED DESCRIPTION OF THE INVENTION

As summarised above, the present invention is based, in essence, on the finding that triazacyclononane-based ligands of formula (I), which are also referred to herein as ligands L and chelants L, may be used to enhance the ability of complexes that do not comprise such ligands in the curing of alkyd-based resins. Moreover, we show in the examples section below that the enhancement of the siccative effect of complexes by an archetypal chelant of formula (I)—1,4,7-trimethyl-1,4,7-triazacyclononane—is more marked on complexes that do not comprise a chelant of formula (I) than $[Mn_2(\mu\text{-}O)_3(Me_3\text{-}TACN)_2](PF_6)_2 \cdot H_2O$, a representative example of one that does. This is particularly surprising given that the molar ratio of chelant of formula (I):manganese ions will be greater in this comparative example than in the examples of the invention. There would have been no reason prior to the present invention for this to have been anticipated.

The oxidatively curable resin of the formulations described herein is alkyd-based. As noted above, alkyd resins are a well-understood binder class used in film-forming coating compositions. The term coating composition is to be interpreted broadly and embraces, for example, varnishes, primary coats, filling pastes and glazes. Coating compositions may be solvent-based or water based, e.g. emulsions. Typical coating compositions comprise solvent-based air-drying coatings and/or paints for domestic use. Formulations that may be prepared in accordance with particular embodiments of the present invention (including the fully formulated oxidatively curable coating compositions described herein) are paints. These formulations (including the fully formulated oxidatively curable coating compositions described herein) may comprise inks, for example a metal plate ink, lithographic ink, relief printing ink, screen ink or offset overprinting ink.

By oxidatively curable alkyd-based resin formulations is meant herein liquids that form a continuous solid coating as a consequence of the course of oxidative reactions (curing) and, generally, evaporation of a liquid continuous phase (generally solvent).

Typically, curing results in formation of cross-linkages and other bond formations through reactions involving unsaturated components within alkyd-based resin formulations.

In alkyd-based resin formulations, also referred to herein as alkyd-based formulations, the major binder present is an alkyd. By binder is meant in the art and herein the film-forming (curable) component within curable compositions, i.e. the component within the compositions that forms the desired three-dimensional network upon curing.

Typically the curable component of an oxidatively curable composition (e.g. a formulation that may be prepared in accordance with the present invention) will comprise between about 1 and about 98% by weight, for example between about 1 and about 90% by weight of the total weight of the composition, e.g. between about 20 and about 70% by weight of the total weight of the composition. At least 50% by weight of the oxidatively curable portion (i.e. of the binder) in an oxidatively curable alkyd-based resin, i.e. from about 50% by weight to about 100% by weight, is curable alkyd resin. Typically, at least 75% by weight of the binder in an oxidatively curable alkyd-based resin, i.e. from about 75% by weight to about 100% by weight (e.g. from about 90% by weight to about 100% by weight), is curable alkyd resin. According to particular embodiments, about 100% by weight of the binder in an oxidatively curable alkyd-based resin is curable alkyd resin. The balance, if any, of the curable (i.e. binder) component may be, for example, curable acrylate, urethane, polybutadiene and epoxy ester resins. The skilled person is aware that introducing quantities of curable binders other than curable alkyds allows the distinct properties of such binders to be introduced to a controllable degree into the ultimate coating resultant from application of a composition, such as an oxidatively curable composition, which may be made from the formulations described herein, and is within the scope of the present invention.

As described above, oxidatively curable alkyd resins are a well-understood and indeed dominant binder in many oxidatively curable paints (both for commercial and domestic use) and other coating compositions. They are employed, in particular, in solvent-based coating compositions.

Alkyds (used synonymously herein with alkyd resins) are produced by the condensation, typically polycondensation, of polyols with carboxylic acids or anhydrides. To make them susceptible to the so-called drying process, some alkyd resins (i.e. those that are oxidatively curable, present in the formulations described herein) are reacted with unsaturated triglycerides or other source of unsaturation. Plant and vegetable oils, such as linseed oil, are frequently used as the source of triglycerides. The term oxidatively curable alkyd resin thus generally refers in the art, and herein, to polyesters modified with fatty acids. As is known in the art, alkyd resins are generally prepared via condensation polymerisation reactions between three types of monomers: (i) one or more polyalcohols (also known as polyols), (ii) one or more polybasic acids (also known as polyacids); and (iii) long chain unsaturated fatty acids or triglyceride oils, which confer upon the alkyds the susceptibility towards curing.

Owing to its presence in naturally occurring oils, glycerol is a widely used polyol in the preparation of alkyds. Other examples of suitable polyhydric alcohols include: pentaerythritol, dipentaerythritol, ethylene glycol, diethylene glycol, propylene glycol, neopentyl glycol, trimethylol propane, trimethylol ethane, di-trimethylol propane and 1,6-hexane diol.

Polycarboxylic acids and the corresponding anhydrides, used to synthesise alkyds, comprise aromatic, aliphatic and cycloaliphatic components, which are generally derived from petrochemical feedstocks. Typical examples of such polyacids include: phthalic acid and its regioisomeric analogues, trimellitic acid, pyromellitic acid, pimelic acid, adipic acid, azelaic acid, sebacic acid, maleic acid, fumaric acid and tetra-hydrophthalic acid.

Suitable so-called drying and semi-drying fatty acids or mixture thereof, useful herein, are typically ethylenically unsaturated conjugated or non-conjugated $C_{2-24}$ carboxylic acids, such as oleic, ricinoleic, linoleic, linolenic, licanic acid and eleostearic acids or mixture thereof, typically used in the forms of mixtures of fatty acids derived from natural or synthetic oils.

By semi-drying and drying fatty acids is meant fatty acids that have the same fatty acid composition as the oils (i.e. the esters) from which they are derived. The classification of the oils is based on the iodine number: for a drying oil the iodine number is >140; for a semi-drying oil the iodine number is ranging between 125 and 140, and for a non-drying oil the iodine number is <125 (see "*Surface Coatings*", part 1, Chapman & Hall, London, page 55, 1993).

Typically, oxidatively curable alkyd-based formulations, both generally and those made according to the invention, are liquids. More typically still, such formulations are solvent-based, i.e. they comprise an organic solvent (which may be a mixture of solvents) for the binder and, in accordance with the method of the invention, the chelant of formula (I) and the complex.

In other words, "solvent-based" implies to the skilled person in this context formulations that are based on organic (i.e. non-aqueous) solvents, i.e. comprising an organic solvent as a liquid continuous phase. Examples of suitable solvents include aliphatic (including alicyclic and branched) hydrocarbons, such as hexane, heptane, octane, cyclohexane, cycloheptane and isoparaffins; aromatic hydrocarbons such as toluene and xylene; ketones, e.g. methyl ethyl ketone and methyl isobutyl ketone; alcohols, such as secondary butanol, isopropyl alcohol, n-butyl alcohol and n-propyl alcohol, glycols such as propylene glycol; alcohol ethers and esters, glycol monoethers, such as the monoethers of ethylene glycol and diethylene glycol; monoether glycol acetates, such as 2-ethoxyethyl acetate; N-methylpyrrolidone; as well as mixtures thereof. Isomeric variants are included. Thus, for example, the term hexane embraces mixtures of hexanes. According to particular embodiments of the invention, the solvent is a hydrocarbyl (i.e. hydrocarbon) solvent, e.g. an aliphatic hydrocarbyl solvent, e.g. solvents comprising mixtures of hydrocarbons. Examples include white spirit and solvents available under the trademarks Shellsol, from Shell Chemicals and Solvesso and Exxsol, from Exxon.

Whilst, according to many embodiments of the present invention, compositions and formulations are solvent-based, water-based alkyd-based resin formulations and coating compositions are also well-known and the compositions and formulations described herein may be water-based (i.e. comprise water as a continuous liquid phase). Accordingly, compositions and formulations described herein may be of alkyd-based resin formulations in the form of emulsions, and may thus comprise a suitable emulsifier, as is well known in the art.

When an alkyd-based formulation or composition is referred to herein as "oxidatively curable", it is to be understood that this term is being used to describe a composition susceptible to the reactions that occur between unsaturated groups (e.g. carbon-carbon double bonds) and oxygen from the air, which reactions constitute oxidative curing and are manifested in hardening and formation of solid coatings obtainable from such compositions or formulations. Thus, an oxidatively curable alkyd-based resin formulation is a formulation capable of oxidative curing, but which has not yet been allowed to cure. The formation of the desired coating resultant from curing may be accelerated through the use of catalytic drying, for example by siccatives such as transition metal-based driers.

The nature of the chelants of formula (I) (i.e. ligands/chelants L) will now be described. Before doing so, it is to be understood that a chelating agent (used interchangeably herein with the term "chelant") means a polydentate ligand capable of bonding to at least one transition metal ion through coordinate bonds between two or more atoms of the chelant (so-called donor atoms) and a common transition metal ion, chelation herein and as the term is customarily used in the art requiring that two or more of the atoms of the chelant coordinate to the same transition metal ion.

It will be understood that more than one chelant of formula (I) may be used in accordance with the invention. Typically, however, only one such chelant will be used.

According to particular embodiments, each R within formula (I) is independently selected from the group consisting of $C_{1-24}$alkyl, $C_{6-18}$aryl, $C_{6-18}$aryl$C_{1-6}$alkyl, and $CH_2COOH$. More commonly, each R is independently selected from the group consisting of $C_{1-18}$alkyl, $C_{6-10}$aryl, and $C_{6-18}$arylmethyl. According to particular embodiments, each R is independently selected from the group consisting of $C_{1-10}$alkyl and benzyl. According to other, even more specific, embodiments, each R is independently selected from the group consisting of $C_{1-6}$alkyl. According to particular embodiments, each R group is the same, typically $C_{1-6}$alkyl, in particular methyl.

According to further particular embodiments, specifically contemplating each of the particular embodiments described in the immediately preceding paragraph, $R_1$, $R_2$, $R_3$, and $R_4$ are independently selected from hydrogen and methyl, typically in which each $R_1$, $R_2$, $R_3$, and $R_4$ is the same, in particular embodiments of which each of $R_1$, $R_2$, $R_3$, and $R_4$ is hydrogen. According to particular embodiments of the invention, therefore, the chelant of formula (I) is thus 1,4,7-trimethyl-1,4,7-triazacyclononane ($Me_3$-TACN).

Without wishing to be bound to theory, whilst amines are often susceptible to aerial oxidation, the use of 1,4,7-triazacyclononane-based chelants of formula (I) described herein is believed to be particularly advantageous since these cyclic triamines show a high stability towards aerial oxidation. This may be attributable to protonation of the 1,4,7-triazacyclononane moieties owing to their very high pKa values (of around 12-13). The protons may be provided by water or protic solvents present in formulations and compositions of the invention, or from moisture in the air. Moreover, the proton is bound/bridged to the three nitrogen donor atoms when the chelant is protonated because of the structure of the cyclic triamine, which confers still further stability (cf. P Chaudhuri and K Wieghardt, *Prog. Inorg Chem.*, 35, 329 (1987)).

The chelants of formula (I) used in the method and use of the invention can be introduced (i.e. contacted with the other components of the formulation) as free amines, or as protonated salts, such as those described elsewhere (see for example EP 0 902 021 A2 (Clariant GmbH)). The chelants can also be introduced as a solution, or a slurry/suspension in a solvent (for example an alcohol or a ketone).

Introducing the chelant as a solution can be advantageous in permitting improved and/or easier mixing with the (solution of) binder(s). It may be beneficial to dilute chelant in a suitable solvent before adding to the binder if use of a very small amount of chelant of formula (I) is desired, so greater accuracy of dosing can be achieved. Depending on the properties of the chelant L and the desired resin-chelant formulation, suitable solvents include aliphatic hydrocarbons, such as heptanes, ethers, such as Dipropylene Glycol Methyl Ether in Dowanol DPM™ (Dow) or Propylene Glycol Methyl Ether in Dowanol PM™ (Dow), water, alcohols, such as ethanol or propylene glycol, or mixtures thereof. The skilled person will be able to easily formulate such solutions, generally using solvents such as those described above.

The complex used in the method of the invention (for example of formula (II) as described below) can be added a solid, a suspension, or as a solution in a variety of solvents. Again, the choice of dilution of the manganese complex can be made depending on the desired concentration of manganese ions in the alkyd-based resin formulation.

The complex comprising one or more manganese ions having oxidation states independently selected from (II)-(V) and the chelant chelating through either nitrogen atoms or nitrogen and oxygen atoms (referred to herein as ligand L' or chelant L') may, for example, be of the generic formula (II):

$$[Mn_a L'_k X_n] Y_m \qquad (II),$$

in which:

each Mn independently represents a metal ion selected from Mn(II), Mn(III), Mn(IV) and Mn(V);

each X independently represents a coordinating species selected from any mono-, bi-, or tri-charged anions and any neutral molecule able to coordinate a manganese ion Mn in a mono-, bi- or tridentate manner;

each Y is independently a non-coordinating counterion;

a represents an integer from 1 to 10;

k represents an integer from 1 to 20;

n represents an integer from 1 to 20;

m represents an integer from 1 to 20; and

L' represents the chelant chelating through either (i) nitrogen atoms or (ii) nitrogen atoms and oxygen atoms, or a hydrate thereof.

Chelants L' in the complexes comprising them are not particularly limited but may not be of formula (I). Chelant L' may contain solely nitrogen donor atoms or it may contain mixed nitrogen-oxygen donor groups, some of which exemplified below. According to particular embodiments, chelant L' chelates solely through nitrogen donor atoms.

It will be understood that more than one chelant L'-containing complex, e.g. of formula (II), may be used in the method and use of the invention. Typically, however, only one kind of Mn(II) complex will be used.

According to particular embodiments of formula (II), alone or in combination:

X represents a coordinating species selected from $O^{2-}$, $[R^6BO_2]^{2-}$, $R^6COO^-$, $[R^6CONR^6]^-$, $OH^-$, $NO_3^-$, $NO$, $S^{2-}$, $R^6S^-$, $PO_4^{3-}$, $HPO_4^{2-}$, $H_2PO_4^-$, $[PO_3OR^6]^{3-}$, $H_2O$, $CO_3^{2-}$, $HCO_3^-$, $R^6OH$, $NR^6R^7R^8$, $R^6OO^-$, $O_2^{2-}$, $O_2^-$, $R^6CN$, $Cl^-$, $Br^-$, $I^-$, $OCN^-$, $SCN^-$, $CN^-$, $N_3^-$, $F^-$, $RO^-$, $ClO_4^-$, $CF_3SO_3^-$;

Y represents a counterion selected from $ClO_4^-$, $CF_3SO_3^-$, $[B(R^6)_4]^-$, $[FeCl_4]^-$, $PF_6^-$, $R^6COO^-$, $NO_3^-$, $RO^-$, $N^+R^6R^7R^8R^9$, $Cl^-$, $Br^-$, $I^-$, $F^-$, $S_2O_6^{2-}$, $OCN^-$, $SCN^-$, $H_2O$, $BF_4^-$, $SO_4^{2-}$, $R^6$, $R^7$, $R^8$ and $R^9$ each independently represents hydrogen, optionally substituted alkyl or optionally substituted aryl;

a represents an integer from 1 to 4;
k represents an integer from 1 to 8;
n represents an integer from 1 to 10; and
m represents an integer from 1 to 10.

According to particular embodiments, a=1 or 2 and k=1 to 4.

As used herein, within the definitions provided above for formula (II) and elsewhere, unless a context expressly dictates to the contrary, the following definitions apply:

By alkyl is meant herein a saturated hydrocarbyl radical, which may be straight-chain, cyclic and/or branched. Alkyl groups will typically comprise from 1 to 24 carbon atoms, more usually 1 to 10 carbon atoms, more usually still 1 to 6 carbon atoms. The simplest alkyl group is methyl ($—CH_3$).

Aromatic moieties may be polycyclic, i.e. comprising two or more fused (carbocyclic) aromatic rings. Typically aryl groups will comprise from 6 to 18 carbon atoms, more typically from 6 to 14 carbon atoms. The simplest aryl group is phenyl. Naphthalene and anthracene are examples of polycyclic aromatic moieties. Phenyl and naphthyl are typical aryl groups.

Heteroaromatic moieties are aromatic, heterocyclic moieties, which comprise one or more heteroatoms, typically oxygen, nitrogen or sulfur, often nitrogen, in place of one or more ring carbon atoms and any hydrogen atoms attached thereto, in a corresponding aromatic moiety. Heteroaromatic moieties, for example, include pyridine, furan, pyrrole and pyrimidine. Benzimidazole is an example of a polycyclic heteroaromatic moiety.

Aryl radicals are formed formally by abstraction of one hydrogen atom from an aromatic moiety. Thus phenyl is the aryl radical corresponding to benzene. Analogously, pyridyl is the heteroaryl radical corresponding to pyridine. Unless a context dictates to the contrary, pyridyl is typically 2-pyridyl.

By arylalkyl is meant aryl-substituted alkyl. Analogously, by aminoalkyl is meant amino-substituted alkyl, by hydroxyalkyl is meant hydroxy-substituted alkyl and so on.

Where an alkyl or aryl group is optionally substituted, this may be with one or more substituents independently selected from the group consisting of -halo, $—OH$, $—OR^{10}$, $—NH_2$, $—NHR^{10}$, $—N(R^{10})_2$, $—N(R^{10})_3^+$, $—C(O)R^{10}$, $—OC(O)R^{10}$, $—CO_2H$, $—CO_2^-$, $—CO_2R^{10}$, $—C(O)NH_2$, $—C(O)NHR^{10}$, $—C(O)N(R^{10})_2$, -heteroryl, $—R^{10}$, $—SR^{10}$, $—SH$, $—P(R^{10})_2$, $—P(O)(R^{10})_2$, $—P(O)(OH)_2$, $—P(O)(OR^{10})_2$, $—NO_2$, $—SO_3H$, $—SO_3^-$, $—S(O)_2R^{10}$, $—NHC(O)R^{10}$ and $—N(R^{10})C(O)R^{10}$, wherein each $R^{10}$ is independently selected from alkyl, aryl, arylalkyl (e.g. benzyl) optionally substituted one or two or more times with a substituent selected from the group consisting of -halo, $—NH_3^+$, $—SO_3H$, $—SO_3^-$, $—CO_2H$, $—CO_2^-$, $—P(O)(OH)_2$, $—P(O)(O)_2$.

A wide variety of a chelants, for example bidentate, tridentate, tetradentate or pentadentate nitrogen or nitrogen/oxygen donor chelants exist, which may be used to bind to the Mn(II), Mn(III), Mn(IV), or Mn(V) ions of the complex used in the method and use of the invention, with Mn(II), Mn(III), or Mn(IV) being more typical. A suitable overview of the variety of chelants, be they nitrogen-donating or nitrogen- and oxygen-donating, can be found in for example: Comprehensive Coordination Chemistry II, volume 5, Ed. J A McCleverty, T J Meyer, Elsevier, 2005. When no specific reference is given below, the reader is referred to this volume of Comprehensive Coordination Chemistry, where all relevant references are given.

By bidentate, tridentate, tetradentate or pentadentate chelants is meant that these chelants will bind by 2, 3, 4, and 5 donors respectively per manganese ion. If a chelant has 8 donor groups, four of which bind to one manganese ion and four of which bind to another manganese ion, it will be still considered to be a tetradentate chelant according to this definition. Also if four donor atoms of a chelant bind to a manganese ion, the chelant is to be regarded as tetradentate even if there are additional, but non-coordinating, nitrogen or oxygen donor groups. Further, one can understand that, for example, two bidentate chelants may bind to a single manganese ion. A well-known example of such binding is 2,2'-bipyridine (bpy), which easily forms e.g. dinuclear manganese complexes of the following composition: $[Mn^{III}(bpy)_2(\mu\text{-}O)_2Mn^{IV}(bpy)_2]^{3+}$ (see S R Cooper, M Calvin, J. Am. Chem. Soc., 99, 6623 (1977)). Another well-known example of a bidentate nitrogen donor chelant is 1,10-phenanthroline. Aliphatic nitrogen donor chelants such as N,N,N',N'-tetramethylethylenediamine are also useful in accordance with the present invention.

A well-known bidentate mixed nitrogen-oxygen donor chelant is 2-picolinic acid. Also numerous tridentate chelants known to bind to manganese ions have been described. Non-limiting examples include 2,2':6',2''-terpyridine, N,N,N',N,"N"'-pentamethyldiethylenetriamine, diethylenetriamine, 1,1,1-tris(aminomethyl)ethane (tame), bis(pyridin-2-ylmethyl)-N-ethylamine, 6-dimethylamino-1,4,6-trimethyl-1,4-diazacycloheptane, the tris(pyrazolyl)borate anion, tris(pyrazolyl)methane, tris(imidazol-2-yl)amine, and tris(pyridin-2-yl)methane.

Furthermore, macrocyclic chelants may be used as chelants L' (provided that these do not embrace chelants of formula (I)). For example 1,5,9-triazacyclododecane or 1,4,7-triazacyclononane could be employed as well. Tetradentate chelants include tris(pyridin-2-ylmethyl)amine-TPA- (and various derivatives with other heteroaromatic donor groups), N,N'-bis(pyridin-2-ylmethyl)ethylenediamine (and derivatives), triethylene-tetraamine (and the alkylated versions), or macrocylic chelants, such as 1,4,7,10-tetraazacyclododecane or 1,4,8,11-tetraazacyclotetradecane. Pentadentate chelants include N-methyl-N,N'N'-tris(pyridin-2-ylmethyl)-ethylenediamine, N,N-bis(2-pyridylmethyl)-N-(bis-2-pyridylmethyl)amine, tetraethylene-pentamine (and the alkylated versions), dimethyl 2,4-di-(2-pyridyl)-3-methyl-7-(pyridin-2-ylmethyl)-3,7-diaza-bicyclo[3.3.1]nonan-9-one-1,5-dicarboxylate. Also chelants can be used that have more than 5 donor atoms, for example an ethylene-bridged TPA ligand (with the ethylene bridge bound to the pyridin-2-yl groups on the 5 position), has been described by K D Karlin et al. (*Inorg. Chem.* 33, 4625 (1994) and *J. Am. Chem. Soc.*, 117, 12498 (1995)) and contains 8 donor groups, potentially binding to 2 manganese ions.

A specific class of suitable chelants L' to bind to Mn(II), Mn(III), Mn(IV), or Mn(V) ions are so-called Schiff base chelants, which contain one or more carbon-nitrogen double bond with the nitrogen atom connected to an aryl or alkyl group, also known as imines. Many manganese complexes with a variety of Schiff base chelants have been published some of which, such as N,N'-ethylenebis(salicylimine) (salen), bis(salicylimine)-1,3-diaminopropane (salpn), 2-(bis(salicylidieneamino)-methylphenolate (salpm), N,N'-bis(salicylidene)diethylenetriamine (saldien), or N,N',N'tris[salicylideneaminoethyl]amine (saltren), have been exemplified in the aforementioned Comprehensive Coordination Chemistry book.

Without wishing to be bound by theory, it is believed that the triazacyclononane-based chelants of formula (I) contacted with the manganese complexes in accordance with the present invention will, at least partially, compete with the chelants L' of the manganese complex with which the chelant of formula (I) is contacted for binding to the manganese ion to furnish catalytically active [LMn(II)(RCOO)$_3$Mn(II)L]$^+$ species, in which the two ligands L are chelants of formula (I) and each RCOO$^-$ is a bridging carboxylate ligand. In some cases, the kinetics of formation of such species might be relatively slow and heating of the mixture resultant from the contacting, for example between about 25° C. and about 60° C. for between about 30 minutes and about 6 hours, can be advantageous.

In the three carboxylate-containing bridges, RCOO$^-$, R may be independently selected from H, C$_{1-24}$alkyl, C$_{6-18}$aryl, a polymeric residue, a chelant according to formula (I) if one or more —R groups of L are —CH$_2$COOH or a chelant L', if L' contains one or more COOH groups. The chelant L', defined above, originates from the manganese complex contacted with the chelant L of formula (I) according to the method of the invention.

According to particular embodiments, each R of the three carboxylate-containing bridges is independently selected from H, C$_{1-20}$alkyl, C$_{6-10}$aryl, a polymeric residue, a chelant according to formula (I) if one or more R groups of L consist of CH$_2$COOH or is a chelant L', if L' contains one or more COOH groups.

According to yet more particular embodiments, each R is independently selected from C$_{1-12}$alkyl, C$_6$H$_5$ (phenyl). Specific examples for these R groups include phenyl, hexyl, octyl, 4-methylpentanoate, 5-methylhexanoate, 2-ethylhexanoate, 3-methylhexanoate, 3,5-dimethylhexanoate, 4,5-dimethylhexanoate, 3,4-dimethylhexanoate, 3,5,5-trimethylhexanoate, 4-methylheptanoate, 5-methylheptanoate, 6-methylheptanoate, 4,6-dimethylheptanoate, 7-methyloctanoate, 8-methyloctanoate, and 9-methyloctanoate.

The presence of three monoanionic carboxylate bridges in combination with two manganese ions, each having a charge of 2+, will render the charge of the complex 1+. Evidence for the formation of dinuclear Mn(II) species can be provided by the observation of ESR signals typical for Mn(II)Mn(II)(L)$_2$ species (cf. A P Golombek and M P Hendrich, *J. Magn. Res.*, 2003, 165, 33-48 or J W de Boer, W R Browne, J Brinksma, P L Alsters, R Hage and B L Feringa, *Inorg. Chem.*, 2007, 46, 6353-6372).

It will be understood from the discussion above that the three carboxylate bridges may be provided by species present within the alkyd-based resin, or by chelants L or L'. Sometimes these carboxylates may be provided by carboxylic acids or ill-defined polymeric species comprising carboxylic acids within the alkyd-resin itself. Additionally, it is within the scope of the invention to add additional carboxylate species, for example of formula RCOOZ, in accordance with the method and use of the invention. Typically, where this is done, Z is selected from H, Na, K, Li and NR'$_4$, with R' being selected from H and C$_{1-8}$alkyl, Z being most typically H or Na; and R is C$_{1-24}$alkyl or C$_{6-18}$aryl.

As is known, the ability of metal driers to catalyse the curing of oxidatively curable coating compositions arises from their ability to participate in redox chemistry: the nature of the counterion(s) Y are not of great importance. The choice of these may be affected by the solubility of the [LMn(II)(RCOO)$_3$Mn(II)L]$^+$ and/or the complex comprising chelant L' (e.g. a [Mn$_a$L'$_k$X$_n$]$^{x+}$ complex, x being the charge of the complex) in a given formulation or composition. For example, counterion(s) Y such as chloride, sulfate or acetate may serve to provide a readily water-soluble complex, if a water-based paint is desired. When using solvent-based (i.e. non-aqueous) compositions, it may be desirable to use larger, less popular counterions such as 2-ethylhexanoate. Suitable counterion(s) Y (and coordinating species X) may be selected without difficulty by the skilled person.

According to particular embodiments, X and Y may be independently selected from the group consisting of bromide, iodide, nitrate, sulfate, methoxide, ethoxide, formate, acetate, propionate, 2-ethylhexanoate, octanoate, neodecanoate (3,3,5,5-tetramethylhexanoate), naphthenate, oxide, and hydroxide. It will be understood that counterions Y serve to balance the charge resultant from the complex formed by the manganese ion(s) Mn, coordinating species X and chelant(s) L or L'. Thus, if the charge on the complex is positive, there will be one or more anions Y. Conversely, there will be one or more cations Y if the charge on the complex is negative.

It will be understood from the foregoing discussion that complexes of formula (II) embrace dinuclear manganese complexes (i.e. comprising two Mn ions), such as those containing hydroxide, carboxylate or halide as bridging ligands (bridging ligands indicated with μ-prefix). Higher nuclearity complexes may have a variety of bridging groups, such as those containing hydroxide, oxo, carboxylate or halide as bridging (μ-) ligands. Also combination of bridging and non-bridging chelants X may be present. Non-limiting examples of such binding modes can be found in Comprehensive Coordination Chemistry II, volume 5, Ed. J A McCleverty, T J Meyer, Elsevier, 2005.

The chelant of formula (I) is typically used in methods according to the present invention in concentrations of from 0.0003 to 3% by weight, often from 0.001 to 1 wt %, more often from 0.003 to 0.3% by weight, and more typically from 0.006 to about 0.2% in weight.

The amount of manganese ions used in the method and use of the invention is typically between about 0.0001 and about 0.3 wt %, more typically still between about 0.0005 and about 0.2 wt %, more typically between about 0.001 and about 0.1 wt %, even more typically between about 0.003 and about 0.05 wt % and most typically between about 0.005 and about 0.03 wt %, with respect to curable resin.

Where percentages by weight are referred to herein (wt % or % w/w), these mean, unless a context clearly dictates to the contrary, percentages by weight with respect to the binder component (i.e. the alkyd-based resin and any other binders present). In the context of the preparation of an oxidatively curable alkyd-based coating formulation according to the present invention, for example, the combined weights of the binders are those with respect to which weight percentages herein are based. For example, where a formulation described herein comprises 0.003% w/w of chelant of formula (I), this is with respect to the weight of the curable components of the formulation (i.e. the weight of the binder(s)).

Contacting of the chelant L of formula (I) with the manganese complex comprising the chelant L' may be achieved in a number of ways. For example, the chelant of formula (I) can be added to a composition comprising the alkyd-based resin, as discussed above, after which the Mn complex comprising chelant L' may be added. Equally feasible is initial contact of the Mn complex comprising chelant L' with the alkyd resin followed by introduction of the chelant of formula (I).

As a further alternative, both chelant of formula (I) and Mn complex comprising chelant L' may be added at the same time. It will be understood from the foregoing discussion that $[LMn(II)(RCOO)_3Mn(II)L]^+$ species may be formed in situ in the alkyd-based resin formulation. Such species may also be formed by contacting the chelant of formula (I) in a solvent, for example a non-aqueous solvent, with a Mn complex comprising chelant L'.

Suitable non-aqueous solvents include aliphatic (including alicyclic and branched) hydrocarbons, such as hexane, heptane, octane, cyclohexane, cycloheptane and isoparaffins; aromatic hydrocarbons such as toluene and xylene; ketones, e.g. methyl ethyl ketone and methyl isobutyl ketone; alcohols, such as ethanol, n-butyl alcohol, n-propyl alcohol, 2-propanol, secondary butanol, isopropyl alcohol, n-butyl alcohol and n-propyl alcohol, glycols such as 1,2-propylene glycol, 1,3-propylene glycol; glycerol, alcohol ethers and esters, glycol monoethers, such as the monoethers of ethylene glycol and diethylene glycol; such as methoxypropylene glycol acetate, monoether glycol acetates, such as 2-ethoxyethyl acetate, diethylene glycol n-butyl-ether acetate or propyleneglycolmethylether acetate (Dowanol™ PMA, ex Dow).; N-methylpyrrolidone; as well as mixtures thereof. Isomeric variants are included. Thus, for example, the term hexane embraces mixtures of hexanes. According to particular embodiments of the invention, the solvent is a hydrocarbyl (i.e. hydrocarbon) solvent, e.g. an aliphatic hydrocarbyl solvent, e.g. solvents comprising mixtures of hydrocarbons. Examples include white spirit and solvents available under the trademarks Shellsol, from Shell Chemicals and Solvesso and Exxsol, from Exxon. The choice of a suitable solvent will depend on the properties of, including mixing into, the alkyd-based resin formulation, as well as the properties of the manganese complex of chelant L', including the choice of non-coordinating counterions Y. The skilled person will be able to optimise the choice of the solvent(s) and the concentrations of the chelant of formula (I) and the Mn complexes of chelant L'.

Although the use of non-aqueous solvents in the method and use of the invention is more common, it will be appreciated that the use of aqueous solvents (that is to say solvent systems consisting of or comprising water) may also be of use. In this regard, reference is made to WO 2012/039250 (OMG Additives Limited) with regard to the teaching therein of methods comprising contacting an oxidatively curable solvent-based coating composition (i.e. compositions based on organic solvents) with an aqueous solution of a siccative.

The skilled person will be able to select the most appropriate procedure for any given circumstance. For example, it may be desirable to delay adding the manganese complex comprising chelant L' to a mixture of alkyd resin and chelant L, whereby to delay formation of what is believed to be the active siccative species ($[LMn(II)(RCOO)_3Mn(II)L]^+$).

Where, for example, chelant of formula (I) and manganese complex comprising chelant L' are mixed prior to contacting with alkyd-based resin, the amount of manganese in the optionally non-aqueous solution will be typically between about 0.1 and about 10 wt %, more typically between about 0.3 and about 3 wt %. The typical amount of chelant of formula (I) used in the use of the invention or in the formulations prepared in accordance with the method of the invention (in wt %, i.e. with respect to curable component) will depend on both the quantity of manganese ions and the desired molar ratio between chelant of formula (I) and manganese ions. For example, if the chelant of formula (I) is 1,4,7-trimethyl-1,4,7-triazacyclononane, which has a molecular weight of 171 Da, and the desired concentration of manganese ions is 0.02 wt % in the formulation, and if the desired molar ratio between Mn and 1,4,7-trimethyl-1,4,7-triazacyclononane is 1:1, the amount of 1,4,7-trimethyl-1,4,7-triazacyclononane in the optionally non-aqueous formulation will be 2×171/55=0.062 wt %. Consequentially, the amount of 1,4,7-trimethyl-1,4,7-triazacyclononane in the mixture that will be contacted with the alkyd based resin will typically be between 0.3 and 30 wt % and more typically between 1 and 10 wt %. The skilled person can calculate without difficulty how much of the Mn complex comprising chelant L' needs to be added to an optionally non-aqueous solution to furnish the appropriate concentration of manganese ions, which will of course depend on the molecular weight of the complex, the number of manganese ions in the complex comprising the chelant L' (its nuclearity), and the desired molar ratio between the chelant of formula (I) and the Mn ions in the formulation to be prepared.

Solvents used in the method or use of the invention may contain water, typically arising from solvents being less than completely pure. For example, the solvents from which the formulations described herein may be made can comprise from 0 to 20 wt % of water. More typically, however, the water content of a solvent used to prepare formulations used in accordance with the invention is less than 10 wt % and still more typically less than 5 wt %. For example, an alcohol that may be useful is commercially available 96% v/v ethanol, in which the majority of the material that is not ethanol is water. Indeed, the large-scale production of most alcohols results in alcohols with water present in them.

The typical molar ratio of chelant according to formula (I):manganese ions in the use of the invention or in the formulation prepared in accordance with the method of the invention is between about 1:1 and about 20:1 (i.e. a range of ratios between about 1 and about 20), often between about 1.5:1 and about 15:1 (i.e. a range of ratios between about 1.5 and about 15), and more often between about 2:1 and about 10:1 (range of ratios between about 2 and about 10). However, the molar ratio of chelant:manganese ions may be less than 1 (for example a molar ratio of chelant:manganese ions of 1:1.5, i.e. a 50% molar excess of manganese ions), or sometimes even a greater excess of manganese ions than this, where for example the manganese ion-containing complex (e.g. of formula (II)) itself has drying activity (i.e. is a siccative). On the other hand, a molar excess of chelant of formula (I) may be beneficial to improve regeneration of catalytically active species during curing, which can lead to improved drying (i.e. curing) performance despite using a lower quantity of manganese ions. Using a stoichiometric excess of chelant of formula (I) can also be advantageous by reducing the intensity of coloured manganese complexes or species. The skilled person will be able to take into account these considerations when preparing oxidatively curable coating formulations, in accordance with the present invention.

The method or use of the invention can, and generally will, be part of the manufacture of a fully formulated oxidatively curable coating composition. In the context of the present invention it will be understood that formulations prepared in accordance with the method of the invention resultant from the use of the invention will comprise a stoichiometric excess of chelant with respect to the concentration of manganese ions present. Moreover, by the term "fully formulated oxidatively curable coating composition" is implied, as is known to those of skill in the art, oxidatively curable formulations that comprise additional components over and above the binder (the oxidatively curable material, which is predominantly oxidatively curable alkyd resin according to the present invention), an aqueous or non-aqueous solvent/liquid continuous phase and any metal driers intended to accelerate the curing process. Such additional components are generally included so as to confer desirable properties upon the coating composition, such as colour or other visual characteristics such as glossiness or mattness), physical, chemical and even biological stability (enhanced biological stability being conferred upon coating compositions by the use of biocides for example), or modified texture, plasticity, adhesion and viscosity.

For example, such optional additional components may be selected from solvents, antioxidants (sometimes referred to as antiskinning agents), additional siccatives (i.e. additional to the siccative resultant from mixing the chelant of formula (I) with the complex according to the method of the invention), auxiliary driers, colourants (including inks and coloured pigments), fillers, plasticisers, viscosity modifiers, UV light absorbers, stabilisers, antistatic agents, flame retardants, lubricants, emulsifiers (in particular where an oxidatively curable coating composition or formulation is aqueous-based), anti-foaming agents, viscosity modifiers, antifouling agents, biocides (e.g. bactericides, fungicides, algaecides and insecticides), anticorrosion agents, antireflective agents, anti-freezing agents, waxes and thickeners. Typically, formulations prepared in accordance with the method of resultant from the use of the invention will comprise at least an organic solvent, selected from the list of solvents described above, a filler and generally an antiskinning agent, in addition to the alkyd and optionally other binders, chelant of formula (I) and the manganese complex contacted according to the method or use of the invention. The skilled person is familiar with the incorporation of these and other components into oxidatively curable coating composition so as to optimise such compositions' properties.

It will be appreciated that some of these optional additional components possess more than one functional property. For example, some fillers may also function as colourants. The nature of any additional components and the amounts used may be determined in accordance with the knowledge of those of skill in the art and will depend on the application for which the curable coating compositions intended. Examples of optional additional components are discussed in the following paragraphs, which are intended to be illustrative, not limitative.

When producing a fully formulated oxidatively curable coating composition that is, for example, a paint, one or more antioxidants (customarily referred to in the art as antiskinning agents) are often included to avoid premature curing of the oxidatively curable coating composition prior to its use. Such premature curing may be manifested by, for example, the formation of a skin on or lumpy matter in the oxidatively curable coating composition as a result of curing during storage, for example hardening of the surface of a paint layer in a can, owing to the activity of the siccative with oxygen on the oxidatively curable binder. Antiskinning agents are understood to reduce skinning by quenching radicals formed and/or by inactivation of drier catalysts by binding to one or more of the coordination sites. Examples include, but are not limited to, methylethylketoxime, acetonoxime, butyraldoxime, methyl-isobutylketoxime, 2-cyclohexylphenol, 4-cyclohexylphenol, t-butyl-hydroquinone, dialkylhydroxylamine, acetylacetonate, ammonia, vitamin E (tocopherol), hydroxylamine, triethylamine, dimethylethanolamine, 2-t-butyl-4-methylphenol, and 2-[(1-methylpropyl)amino]ethanol. According to particular embodiments, the antiskinning agent is selected from the group consisting of methylethylketoxime, acetonoxime, butyraldoxime, dialkylhydroxylamine, ammonia, hydroxylamine, triethylamine, dimethylethanolamine, o-cyclohexylphenol, p-cyclohexylphenol and 2-t-butyl-4-methylphenol.

The quantity of antiskinning agent present in an oxidatively curable coating composition is typically between about 0.001 and about 2.5 wt %. The antioxidant or antiskinning agent may be added to an alkyd-based resin formulation, e.g. prepared according to the invention, prior to or during the preparation of a fully formulated oxidatively curable coating composition (for example a paint or other coating composition).

Colourants include pigments and inks. Titanium dioxide is a pigment commonly included in many coating compositions, in particular paints.

Fillers may be added to an oxidatively curable coating composition for a number of reasons, for example to bulk out the coating composition and to compare particular properties on the cured composition. Typically, fillers will be inorganic solids that are generally introduced in particulate (finely divided) form. Examples include silica, silicates or clays (for example mica, talc, kaolin), carbonate or other minerals and metal salts or oxides (such as marble, quartzite). Other suitable fillers will be evident to the skilled person.

It is also within the scope of the current invention that a paint manufacturer, for example, would add an additional conventional commercial drier, based on for example cobalt soaps. Non-limiting examples include Octa-Soligen® cobalt 6 or Octa-Soligen® cobalt 10 commercially available from OMG).

Additionally, one or more auxiliary driers may be added to a fully formulated oxidatively curable coating composition. Such auxiliary driers may be optional additional components included when practising the method or use of the invention. Such auxiliary driers include fatty acid soaps of zirconium, bismuth, barium, cerium, calcium, lithium, strontium, and zinc. Typically, fatty acid soaps are optionally substituted octanoates, hexanoates and naphthenates. Without being bound by theory, auxiliary driers (sometimes referred to as through driers) are generally understood to diminish the effect of adsorption of the main drier on solid particles often present in an oxidatively curable coating composition. Other non-metal based auxiliary driers may also be present if desired. These may include, for example, thiol compounds, as described in US 2001/0008932 A1 (Bakkeren et al.) or biomolecules as described in US 2005/0245639 A1 (Oostveen et al.). Concentrations of auxiliary driers within oxidatively curable coating compositions (or formulations of the invention) are typically between about 0.01 wt % and 2.5 wt % as is known in the art.

The formulations described herein (including the fully formulated oxidatively curable coating compositions) may be used as a decorative coating, e.g. applied to wood substrates, such as door or window frames, or for other substrates such as those made of synthetic materials (such as plastics including elastomeric materials), concrete, leather, textile, glass, ceramic or metal. The thus-applied composition may then be allowed to cure.

Each and every patent and non-patent reference referred to herein is hereby incorporated by reference in its entirety, as if the entire contents of each reference were set forth herein in its entirety.

The invention may be further understood with reference to the following non-non-limiting clauses:

1. A method of preparing an oxidatively curable formulation, comprising contacting:
   (i) an alkyd-based resin;
   (ii) a chelant of formula (I):

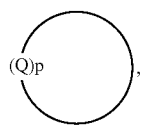

(wherein:

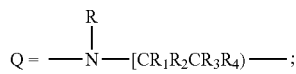

p is 3;
R is independently selected from the group consisting of $C_{1-24}$alkyl, $C_{6-18}$aryl, $C_{6-18}$aryl$C_{1-6}$alkyl, $CH_2CH_2OH$ and $CH_2COOH$; and
$R_1$, $R_2$, $R_3$, and $R_4$ are independently selected from H, $C_{1-4}$alkyl and hydroxy$C_{1-4}$-alkyl); and
(iii) a complex comprising one or more manganese ions having oxidation states independently selected from (II)-(V) and a chelant chelating through either nitrogen atoms or nitrogen and oxygen atoms,
with the provisos that:
(1) the complex does not comprise two manganese ions bridged by three ligands, at least one of which is a bridging oxo ($O^{2-}$) ligand; and
(2) the complex does not comprise a chelant of formula (I).

2. The method of clause 1, wherein R in the chelant of formula (I) used in the method is independently selected from the group consisting of $C_{1-20}$alkyl, $C_{6-18}$aryl and $C_{6-18}$arylmethyl 3. The method of clause 2, wherein each R in the chelant of formula (I) used in the method is independently selected from $C_{1-10}$alkyl, $C_{6-10}$aryl, and $C_{6-10}$arylmethyl.

4. The method of clause 3, wherein each R in the chelant of formula (I) used in the method is independently a $C_{1-6}$alkyl.

5. The method of any one of clauses 1 to 4, wherein each R in the chelant of formula (I) used in the method is the same.

6. The method of clause 5, wherein each R in the chelant of formula (I) used in the method is methyl.

7. The method of any one preceding clause, wherein $R_1$, $R_2$, $R_3$, and $R_4$ in the chelant of formula (I) used in the method are independently selected from hydrogen and methyl.

8. The method of clause 7, wherein each $R_1$, $R_2$, $R_3$, and $R_4$ in the chelant of formula (I) used in the method is hydrogen.

9. The method of clause 1, wherein the chelant of formula (I) used in the method is 1,4,7-trimethyl-1,4,7-triazacyclononane.

10. The method of any one preceding clause, wherein the one or more manganese ions are selected from Mn(II), Mn(III) and Mn(IV).

11. The method of any one preceding clause, wherein the complex comprises one, two, three or four manganese ions.

12. The method of any one preceding clause, wherein the chelant of the complex chelates through only nitrogen atoms.

13. The method of any one preceding clause, wherein the molar ratio of manganese ions and the chelant of formula (I) is between 1:1 and 20:1.

14. The method of clause 13, wherein the molar ratio of manganese ions and the chelant of formula (I) is between 1:1.5 and 15:1.

15. The method of clause 13, wherein the molar ratio of manganese ions and the chelant of formula (I) is between 1:2 and 10:1.

16. The method of any one preceding clause, wherein the formulation comprises a concentration of manganese ions of between about 0.0001 and about 0.3 wt % with respect to curable resin.

17. The method of clause 16, wherein the formulation comprises a concentration of manganese ions of between about 0.0005 and about 0.2 wt % with respect to curable resin.

18. The method of clause 16, wherein the formulation comprises a concentration of manganese ions of between about 0.001 and about 0.1 wt % with respect to curable resin.

19. The method of clause 16, wherein the formulation comprises a concentration of manganese ions of between about 0.003 and about 0.05 wt % with respect to curable resin.

20. The method of clause 16, wherein the formulation comprises a concentration of manganese ions of between about 0.005 and about 0.03 wt % with respect to curable resin.

21. The method of any one preceding clause, wherein the formulation comprises a concentration of chelant of formula (I) of between about 0.0003 and about 3 wt % with respect to curable resin.

22. The method of clause 21, wherein the formulation comprises a concentration of chelant of formula (I) of between about 0.001 and about 1 wt % with respect to curable resin.

23. The method of clause 21, wherein the formulation comprises a concentration of chelant of formula (I) of between about 0.003 and about 0.3 wt % with respect to curable resin.

24. The method of clause 21, wherein the formulation comprises a concentration of chelant of formula (I) of between about 0.006 and about 0.2 wt % with respect to curable resin.

25. The method of any one preceding clause, wherein the formulation comprises a non-aqueous solvent.

26. The method of any one preceding clause, wherein the complex and the chelant of formula (I) are contacted with a composition comprising the alkyd-based resin at the same time.

27. The method of any one preceding clause, wherein the complex and the chelant of formula (I) are contacted with one another and the resultant mixture contacted with a composition comprising the alkyd-based resin.

28. The method of any one of clauses 1 to 25, wherein the chelant of formula (I) is contacted with a composition comprising the alkyd-based resin after which the resultant mixture is contacted with the complex.

29. The method of any one of clauses 1 to 25, wherein the complex is contacted with a composition comprising the alkyd-based resin after which the resultant mixture is contacted with the chelant of formula (I).

30. The method of any one preceding clause, whererein the method further comprises contacting with a compound of formula RCOOZ, wherein:
Z is a cation selected from H, Na, K, Li and $NR'_4$;
R' is selected from H and $C_{1-8}$alkyl; and
R is selected from $C_{1-24}$alkyl and $C_{6-18}$aryl.

31. The method of clause 30, wherein Z is H or Na.

32. Use of a chelant of formula (I), as defined in clause 1, for increasing the rate of curing of an alkyd-based resin formulation by a complex, the complex comprising one or more manganese ions having oxidation states independently selected from (II)-(V) and a chelant chelating through either nitrogen atoms or nitrogen and oxygen atoms, with the provisos that:

(1) the complex does not comprise two manganese ions bridged by three ligands, at least one of which is a bridging oxo ($O^{2-}$) ligand; and (2) the complex does not comprise a chelant of formula (I).

33. The use of clause 32, wherein the chelant of formula (I) used is as defined in any one of clauses 2 to 9.

34. The use of clause 32 or clause 33, wherein the complex is as defined in any one of clauses 10 to 12.

35. The use of any one of clauses 32 to 34, wherein the molar ratio of manganese ions in the complex and the chelant of formula (I) is as defined in any one of claims 13 to 15.

36. The use of any one of clauses 32 to 35, wherein the formulation comprises an amount of the complex such that the concentration of manganese ions of the complex is as defined in any one of claims 16 to 20.

37. The use of any one of clauses 32 to 36, wherein a concentration of the chelant of formula (I) as defined in any one of claims 21 to 24 is used.

38. The use of any one of clauses 32 to 37, wherein a concentration of the alkyd-based resin formulation comprises a non-aqueous solvent.

39. The use of any one of clauses 32 to 38, which comprises contacting the complex and the chelant of formula (I) with a composition comprising the alkyd-based resin at the same time.

40. The use of any one of clauses 32 to 39, which comprises contacting the complex and the chelant of formula (I) with one another and contacting the resultant mixture with a composition comprising the alkyd-based resin.

41. The use of any one of clauses 32 to 38, which comprises contacting the chelant of formula (I) with a composition comprising the alkyd-based resin after which the resultant mixture is contacted with the complex.

42. The use of any one of clauses 32 to 38, which comprises contacting the complex with a composition comprising the alkyd-based resin after which the resultant mixture is contacted with the of formula (I).

43. The use of any one of clauses 32 to 42 wherein the use further comprises contacting the alkyd-based resin formulation with a compound of formula RCOOZ as defined in clause 30 or clause 31.

The non-limiting examples below more fully illustrate the embodiments of this invention.

EXPERIMENTAL

Mn-Complexes Used in the Tests 1,4,7-trimethyl-1,4,7-triazacyclononane ($Me_3$-TACN) (95%) is a product of Catexel Limited and was obtained as disclosed elsewhere (U.S. Pat. No. 5,284,944 (Madison et al.)).

Compound 1: $[Mn_4O_6(H_3TACN)_4](ClO_4)_4$ ($H_3TACN$=1,4,7-triazacyclononane) was obtained as published by K Wieghardt and co-workers (*Angew. Chem. Int Ed. Engl.* 22, 328 (1983)).

Compound 2: $[Mn_2O_2(bpy)_4](ClO_4)_3$ (bpy=2,2'-bipyridine) was prepared as published by S R Cooper and M Calvin, (*J. Am. Chem. Soc.* 99, 6623 (1977)).

Compound 3: $[Mn_2O_2(cyclam)_2](ClO_4)_3$ (cyclam=1,4,8,11-tetraazacyclotetradecane) was prepared as published by K J Brewer et al. (*J. Chem. Soc., Chem. Comm.*, 1219 (1988)).

Compound 4: $[Mn(salpn)(H_2O)]ClO_4$ (salpn=bis(salicylimine)-1,3-diaminopropane) was prepared as published by C A McAuliffe an co-workers (*J. Chem. Soc., Dalton Trans*, 1391 (1985)).

Compound 5: $[Mn_3(dien)_3(\mu_3-O)(\mu-O_2)(\mu-CH_3COO)_2]$ $(ClO_4)_3.H_2O$ (dien=diethylenetriamine) was prepared as published by D C Weatherburn and co-workers (*J. Am. Chem. Soc.* 110, 7550 (1988)).

Compound 6: $[Mn_2(\mu-O)_3(Me_3-TACN)_2](PF_6)_2.H_2O$ has been prepared as disclosed by J H Kerschner et al. (see U.S. Pat. No. 5,274,147).

Alkyd resin (catalogue number A/1552/15; an alkyd resin solution of 70 wt % in white spirits) was obtained from Acros Organics.

Acetonitrile was obtained from VWR/Prolabo.

Ethanol (96%) was obtained from Merck.

Set-Up of the Experiments

The drier was weighted in a glass vial in a quantity such that a final concentration of 0.01 wt % or 0.005 wt % Mn would be obtained. To this 50 µacetonitrile was added to dissolve or homogeneously suspend the drier. If present, $Me_3$-TACN dissolved in 50 µl ethanol was added so that a Mn:$Me_3$-TACN molar ratio of 1:1 or 1:2 was obtained. Then, 3 g alkyd resin was added and the mixture was stirred manually for ca. 1 minute. The next day, the alkyd samples were applied on a glass plate with a layer thickness of 37 µm using a cube applicator. The drying was followed using a BK-3 drying recorder set to 6 or 12 hour. Through drying was defined as when the needle did not penetrate or damage the film any more.

Experiment 1 a. Compound 1—0.01 wt % Mn; without 1 mol equivalent of Me$_3$-TACN per Mn: no drying within 6 hours observed
b. Compound 1—0.01 wt % Mn; with 1 mol equivalent of Me$_3$-TACN per Mn: through drying after 3 hours observed Experiment 2 a. Compound 2—0.01 wt % Mn; without 1 mol equivalent of Me$_3$-TACN per Mn: through drying after 5 hours observed
b. Compound 2—0.01 wt % Mn; with 1 mol equivalent of Me$_3$-TACN per Mn: through drying after 2 hours observed
c. Compound 2—0.005 wt % Mn; with 1 mol equivalent of Me$_3$-TACN per Mn: through drying after 3 hours observed
d. Compound 2—0.005 wt % Mn; with 2 mol equivalent of Me$_3$-TACN per Mn: through drying after 1.75 hours observed Experiment 3 a. Compound 3—0.01 wt % Mn; without 1 mol equivalent of Me$_3$-TACN per Mn: no drying after 6 hours observed
b. Compound 3—0.01 wt % Mn; with 1 mol equivalent of Me$_3$-TACN per Mn: through drying after 1.75 hours observed Experiment 4 a. Compound 4—0.01 wt % Mn; without 1 mol equivalent of Me$_3$-TACN per Mn: no drying after 6 hours observed
b. Compound 4—0.01 wt % Mn; with 1 mol equivalent of Me$_3$-TACN per Mn: through drying after 2.75 hours observed Experiment 5 a. Compound 5—0.01 wt-Mn; without 1 mol equivalent of Me$_3$-TACN per Mn: no drying after 6 hours observed
b. Compound 5—0.01 wt % Mn; with 1 mol equivalent of Me$_3$-TACN per Mn: through drying after 2.5 hours observed
c. Compound 5—0.01 wt % Mn; with 2 mol equivalent of Me$_3$-TACN per Mn: through drying after 1.5 hours observed Comparative Experiments 1

Compound 6 without Me$_3$TACN added
a. Compound 6—0.01 wt % Mn: No drying within 12 hours was observed.
b. Compound 6—0.005 wt % Mn: No drying within 12 hours was observed.

Comparative Experiments 2

Compound 6 with 1 mol Me$_3$TACN per mol Mn added
a. Compound 6—0.01 wt % Mn: Through drying after 3 hours was observed
b. Compound 6—0.005 wt % Mn: Through drying after 7.5 hours was observed The results show the following:

Experiments 1-5 vs comparative experiments 1 and 2: Mixing the well-defined Mn complexes (compounds 1-5) with Me$_3$TACN, which are added to the alkyd based resin, leads to a significantly better drying behaviour than the analogous experiments using compound 6. This is surprising as compound 6 in combination with additional Me$_3$TACN has been exemplified in another patent application (WO 2014/095670 A1) as being exemplary of an active paint drying system. Clearly, using compounds that do not contain Me$_3$TACN give improved alkyd paint-drying activity as compared to compared to compound 6. It is even more surprising as compound 6 already contains a Me$_3$TACN chelant (a particularly common example of chelants of formula (I)) on each Mn ion and therefore in the mixture 2 molar equivalents of Me$_3$TACN per mole of Mn is present when using the mixture of compound 6 and 1 molar equivalent of Me$_3$TACN.

It is also noteworthy that a variety of Mn complexes has been tested, including those containing linear and cyclic amine based ligands (compounds 1, 3 and 5), with compound 5 containing the linear analogue (dien) of H$_3$TACN (compound 1). Compound 2, which is a Mn-bpy containing compound, shows some paint drying activity by itself, as known in literature (see e.g. R E van Gorkum and E Bouwman (*Coord. Chem. Rev.*, 249, 1709 (2005)). However, a clear improvement in activity was noted when Me$_3$TACN was added, showing the superior benefits of Me$_3$TACN over bpy when bound to Mn.

Lastly, it is noted that compound 4 is a typical, well-known Mn-Schiff base compound and shows also the markedly paint drying activity when Me$_3$TACN is added.

The invention claimed is:
1. A method of accelerating the curing of an alkyd-based resin not containing a triazacyclononane-based ligand, comprising:
contacting the alkyd-based resin not containing the alkyl triazacyclononane-based ligand with a manganese ion-containing complex, the manganese-ion complex comprising a ligand chelating through either nitrogen atoms or nitrogen and oxygen atoms, and not containing the triazacyclononane-based ligand;
followed by contacting the alkyd-based resin not containing the triazacyclononane-based ligand with at least one triazacyclononane-based ligand of formula (I):

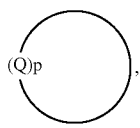
(I)

wherein:

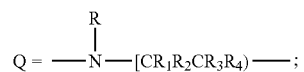

p is 3;
R is independently selected from the group consisting of C$_{1-24}$alkyl, C$_{6-18}$aryl, C$_{6-18}$arylC$_{1-6}$alkyl, CH$_2$CH$_2$OH and CH$_2$COOH; and
R$_2$, R$_3$, and R$_4$ are independently selected from H, C$_{1-4}$alkyl and hydroxyC$_{1-4}$-alkyl); and to form a complex comprising one or more manganese ions having oxidation states independently selected from (II)-(V) and the ligand of formula (I);

the complex comprising one or more manganese ions and the ligand of Formula (I) having a stoichiometric excess of the at least one triazacyclononane-based ligand of formula (I) with respect to the concentration of the Mn ions.

2. The method of claim 1, wherein the ligand of formula (I) used in the method is a 1,4,7-$C_{1-10}$alkyl-1,4,7-triazacyclononane.

3. The method of claim 1, wherein the ligand of formula (I) used in the method is 1,4,7-trimethyl-1,4,7-triazacyclononane.

4. The method of claim 1, wherein the one or more manganese ions are selected from Mn(II), Mn(III) and Mn(IV).

5. The method of claim 1, wherein the complex comprising one or more manganese ions and the ligand of Formula (I) further comprises one, two, three or four manganese ions.

6. The method of claim 1, wherein the molar ratio of manganese ions and the ligand of formula (I) is between 1:1 and 20:1.

7. The method of claim 1, wherein the formulation comprises a concentration of manganese ions of between about 0.0001 and about 0.3 wt % with respect to curable resin.

8. The method of claim 1, wherein the formulation comprises a concentration of ligand of formula (I) of between about 0.0003 and about 3 wt % with respect to curable resin.

9. The method of claim 1, wherein the formulation comprises a non-aqueous solvent.

10. The method of claim 1, wherein the method further comprises contacting with a compound of formula RCOOZ, wherein:

Z is a cation selected from H, Na, K, Li and $NR'_4$;
R' is selected from H and $C_{1-8}$alkyl; and
R is selected from $C_{1-24}$alkyl and $C_{6-18}$aryl.

11. A method of accelerating the curing of an alkyd-based resin not containing a triazacyclononane-based ligand, comprising:

contacting the alkyd-based resin not containing the triazacyclononane-based ligand with a manganese ion-containing complex, the manganese-ion complex comprising a ligand chelating through either nitrogen atoms or nitrogen and oxygen atoms, and not containing the triazacyclononane-based ligand;

followed by contacting the alkyd-based resin not containing the triazacyclononane-based ligand with at least one triazacyclononane-based ligand of formula (I):

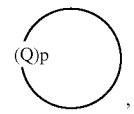

(I)

wherein:

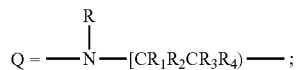

p is 3;
R is independently selected from the group consisting of $C_{1-24}$alkyl, $C_{6-18}$aryl, $C_{6-18}$aryl$C_{1-6}$alkyl, $CH_2CH_2OH$ and $CH_2COOH$; and
$R_2$, $R_3$, and $R_4$ are independently selected from H, $C_{1-4}$alkyl and hydroxy$C_{1-4}$-alkyl; and to form a complex comprising one or more manganese ions having oxidation states independently selected from (II)-(V) and the ligand of formula (I) chelating through either nitrogen atoms or nitrogen and oxygen atoms, with the proviso that:

the complex comprising one or more manganese ions having oxidation states independently selected from (II)-(V) and the ligand of formula (I) does not comprise two manganese ions bridged by three ligands, at least one of which is a bridging oxo ($O^{2-}$) ligand;

the complex comprising one or more manganese ions having oxidation states independently selected from (II)-(V) and the ligand of formula (I) and the alkyd-based resin having a stoichiometric excess of the ligand of formula (I) with respect to the concentration of Mn ions;

and wherein formula (I) is 1,4,7-$C_{1-10}$alkyl-1,4,7-triazacyclononane;

and wherein a molar ratio of manganese ions and the chelant of formula (I) is between 1:1 and 20:1;

and wherein a concentration of manganese ions of between about 0.0001 and about 0.3 wt % with respect to curable resin.

* * * * *